United States Patent
Wu

(10) Patent No.: US 11,184,929 B2
(45) Date of Patent: Nov. 23, 2021

(54) DEVICE AND METHOD OF HANDLING CHANNEL ACCESS IN UNLICENSED BAND

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 67 days.

(21) Appl. No.: 16/231,930

(22) Filed: Dec. 24, 2018

(65) Prior Publication Data

US 2019/0132885 A1    May 2, 2019

Related U.S. Application Data

(62) Division of application No. 15/638,395, filed on Jun. 30, 2017, now Pat. No. 10,645,729.

(Continued)

(51) Int. Cl.
*H04W 74/08* (2009.01)
*H04W 4/12* (2009.01)
(Continued)

(52) U.S. Cl.
CPC ......... *H04W 74/0833* (2013.01); *H04W 4/12* (2013.01); *H04W 28/18* (2013.01);
(Continued)

(58) Field of Classification Search
CPC ............. H04W 74/0808; H04W 74/08; H04W 74/0866; H04W 60/04; H04W 72/1289;
(Continued)

(56) References Cited

U.S. PATENT DOCUMENTS

| | | | |
|---|---|---|---|
| 2008/0095071 A1* | 4/2008 | Lu | H04W 72/048 370/254 |
| 2009/0122768 A1* | 5/2009 | Nakashima | H04W 74/06 370/338 |

(Continued)

FOREIGN PATENT DOCUMENTS

| | | |
|---|---|---|
| EP | 1333620 A2 | 8/2003 |
| WO | 2015180045 A1 | 12/2015 |

OTHER PUBLICATIONS

3GPP TS 36.321 V13.2.0 (Jun. 2016) Technical Specification 3rd Generation Partnership Project; Technical Specification Group Radio Access Network; Evolved Universal Terrestrial Radio Access (E-UTRA); Medium Access Control (MAC) protocol specification (Release 13).

(Continued)

*Primary Examiner* — Rownak Islam
(74) *Attorney, Agent, or Firm* — Winston Hsu

(57) ABSTRACT

A method of handling channel access in an unlicensed band comprises initiating a first channel access procedure according to a first channel access priority class for at least one first packet which is scheduled to be transmitted in a first duration on a carrier in an unlicensed band; setting a first counter in the first channel access procedure; initiating a second channel access procedure according to a second channel access priority class for at least one second packet which is scheduled to be transmitted on the carrier; setting a second counter in the second channel access procedure; transmitting the at least one second packet in a second duration on a first frequency resource on the carrier; and transmitting the at least one first packet in the first duration on a second frequency resource on the carrier.

13 Claims, 6 Drawing Sheets

Related U.S. Application Data

(60) Provisional application No. 62/356,555, filed on Jun. 30, 2016, provisional application No. 62/368,195, filed on Jul. 29, 2016.

(51) Int. Cl.

| | | |
|---|---|---|
| *H04W 28/18* | (2009.01) | |
| *H04W 36/14* | (2009.01) | |
| *H04W 48/16* | (2009.01) | |
| *H04W 60/04* | (2009.01) | |
| *H04W 72/02* | (2009.01) | |
| *H04W 74/00* | (2009.01) | |
| *H04W 84/04* | (2009.01) | |
| *H04W 72/12* | (2009.01) | |

(52) U.S. Cl.
CPC ............ *H04W 36/14* (2013.01); *H04W 48/16* (2013.01); *H04W 60/04* (2013.01); *H04W 72/02* (2013.01); *H04W 74/004* (2013.01); *H04W 74/0808* (2013.01); *H04W 74/0866* (2013.01); *H04W 84/045* (2013.01); *H04W 72/1289* (2013.01)

(58) Field of Classification Search
CPC ............. H04W 74/0833; H04W 72/02; H04W 74/004; H04W 28/18; H04W 48/16; H04W 4/12; H04W 36/14; H04W 84/045
USPC ......................................................... 370/329
See application file for complete search history.

(56) References Cited

U.S. PATENT DOCUMENTS

| | | | |
|---|---|---|---|
| 2010/0195664 A1* | 8/2010 | Ho | ........................ H04L 12/413 370/445 |
| 2014/0362780 A1 | 12/2014 | Malladi | |
| 2014/0363780 A1 | 12/2014 | Vazquez | |
| 2016/0278049 A1 | 9/2016 | Nory | |
| 2016/0345362 A1* | 11/2016 | Lee | ................... H04W 74/0816 |
| 2017/0026297 A1 | 1/2017 | Sun | |
| 2017/0041805 A1 | 2/2017 | Chandrasekhar | |
| 2017/0208605 A1* | 7/2017 | Ansari | .............. H04W 72/0446 |
| 2017/0223730 A1* | 8/2017 | Jiang | ................. H04W 74/0816 |
| 2017/0303311 A1 | 10/2017 | Chu | |
| 2017/0339717 A1 | 11/2017 | Futaki | |
| 2018/0091979 A1 | 3/2018 | Yang | |
| 2018/0109352 A1* | 4/2018 | Nammi | ............. H04W 72/0413 |
| 2018/0131473 A1 | 5/2018 | Moon | |
| 2019/0090276 A1 | 3/2019 | Lee | |

OTHER PUBLICATIONS

3GPP TS 36.213 V13.2.0 (Jun. 2016) Technical Specification 3rd Generation Partnership Project; Technical Specification Group Radio Access Network; Evolved Universal Terrestrial Radio Access (E-UTRA); Physical layer procedures (Release 13).

Search Report dated Oct. 30, 2017 for EP application No. 17178764. 1, pp. 1-8.

Search Report dated Jan. 30, 2018 for EP application No. 17178764. 1, pp. 1-10.

Search Report dated Mar. 5, 2018 for EP application No. 17201622. 2, pp. 1-9.

InterDigital Communications, "Prioritization between RACH Procedures in LTE CA", 3GPP TSG-RAN WG2 #75bis, Tdoc R2-115409, Oct. 10-14, 2011, Zhuhai, China, XP050541073, pp. 1-3.

Pantech, "Priority of execution the RA procedure", 3GPP TSG RAN WG2 Meeting #75bis, R2-115185, Oct. 10-14, 2011, Zhuhai, China, XP050540975, pp. 1-4.

Office action dated Feb. 7, 2019 for the U.S. Appl. No. 15/638,395, filed Jun. 30, 2017, p. 1-13.

Office action dated Jun. 17, 2019 for the U.S. Appl. No. 15/638,395, filed Jun. 30, 2017, p. 1-18.

Office action dated Nov. 22, 2019 for the U.S. Appl. No. 15/638,395, filed Jun. 30, 2017, p. 1-24.

* cited by examiner

| Channel access priority class (p) | $m_p$ | $CW_{min, p}$ | $CW_{max, p}$ | $T_{mcot, p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

FIG. 4

DEVICE AND METHOD OF HANDLING CHANNEL ACCESS IN UNLICENSED BAND

CROSS REFERENCE TO RELATED APPLICATIONS

This is a division application of U.S. application Ser. No. 15/638,395, filed on Jun. 30, 2017, which claims the benefit of U.S. Provisional Application No. 62/356,555 filed on Jun. 30, 2016 and No. 62/368,195 filed on Jul. 29, 2016.

BACKGROUND OF THE INVENTION

1. Field of the Invention

The present invention relates to a device and a method used in a wireless communication system, and more particularly, to a device and a method of handling channel access in an unlicensed band.

2. Description of the Prior Art

A long-term evolution (LTE) system continuously increases peak data rate and throughput by using advanced techniques, such as carrier aggregation (CA), dual connectivity, licensed-assisted access (LAA), etc.

In the LAA, a base station (BS) transmits an uplink (UL) grant for a transmission in a transmission time interval (TTI) on an unlicensed carrier, to the UE. The UE performs a listen-before-talk (LBT) procedure (or called channel access procedure) before performing the UL transmission in the TTI on the unlicensed carrier. However, the UL grant is not valid anymore once the UE misses performing the UL transmission in the TTI. It is not clear how to handle the LBT procedure after missing performing the UL transmission in the TTI.

SUMMARY OF THE INVENTION

The present invention therefore provides a communication device for handling channel access in an unlicensed band to solve the abovementioned problem.

A communication device for handling channel access in an unlicensed band comprises a storage device for storing instructions and a processing circuit coupled to the storage device. The processing circuit is configured to execute the instructions stored in the storage device. The instructions comprise initiating a first channel access procedure according to a first channel access priority class for at least one first packet which is scheduled to be transmitted in a first duration on a carrier in an unlicensed band; setting a first counter in the first channel access procedure; initiating a second channel access procedure according to a second channel access priority class for at least one second packet which is scheduled to be transmitted on the carrier, while running the first channel access procedure; setting a second counter in the second channel access procedure; transmitting the at least one second packet in a second duration on a first frequency resource on the carrier, when the first counter is not decreased to a first predetermined value and the second counter is decreased to a second predetermined value; and transmitting the at least one first packet in the first duration on a second frequency resource on the carrier, when the first counter is decreased to the first predetermined value and the second counter is not decreased to the second predetermined value.

A communication device for handling channel access in an unlicensed band comprises a storage device for storing instructions and a processing circuit coupled to the storage device. The processing circuit is configured to execute the instructions stored in the storage device. The instructions comprise initiating a channel access procedure on a carrier in an unlicensed band according to a first channel access priority class for at least one first packet; setting a counter to a first value according to the first channel access priority class in the channel access procedure; generating or receiving at least one second packet while running the channel access procedure, wherein the at least one second packet is associated to a second channel access priority class; updating the channel access procedure by updating the counter to a second value according to the second channel access priority class; and transmitting the at least one second packet in a duration on a first frequency resource on the carrier, when the counter is decreased to a predetermined value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a table of channel access priority classes according to an example of the present invention.

DETAILED DESCRIPTION

Figure 1:
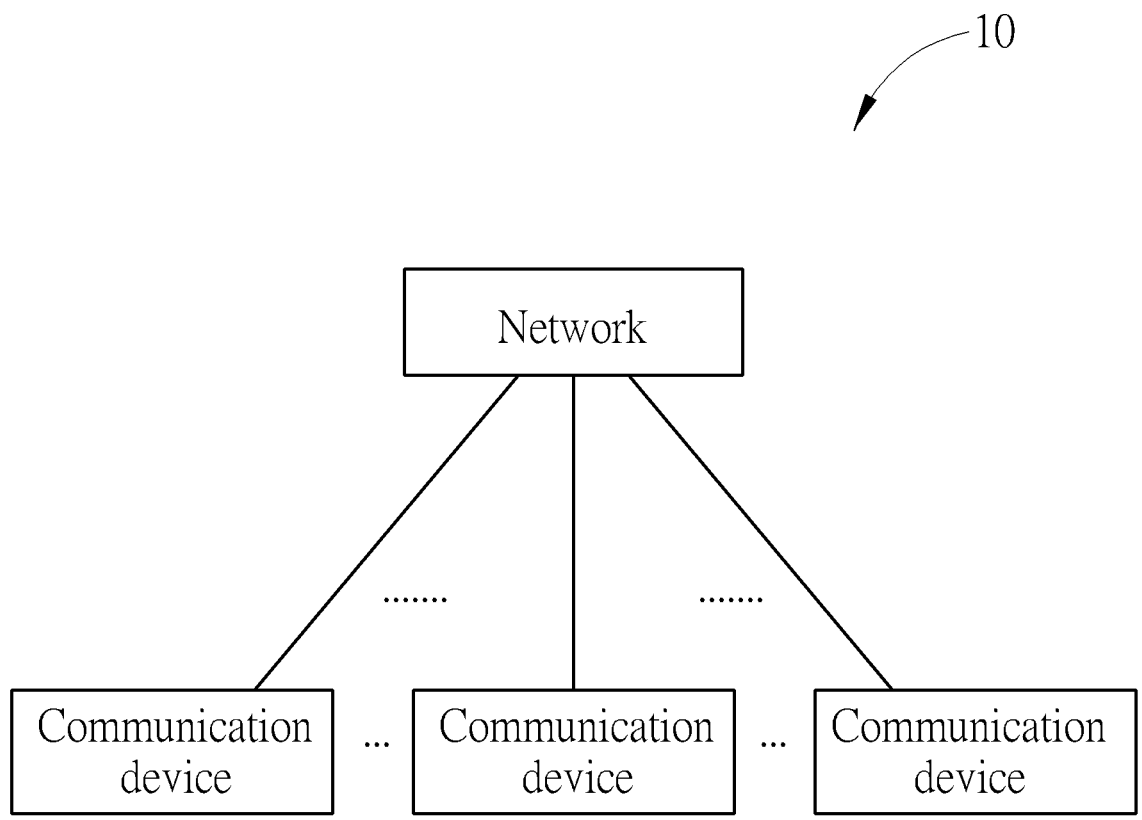
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s).

In FIG. 1, the network and the communication devices are simply utilized for illustrating the structure of the wireless communication system 10. The network may be a radio access network (RAN) including at least one evolved Node-B (eNB) and/or gNB (or called 5G BS or new radio (NR) BS). In general, a BS may also be used to refer any of the eNB and the gNB.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
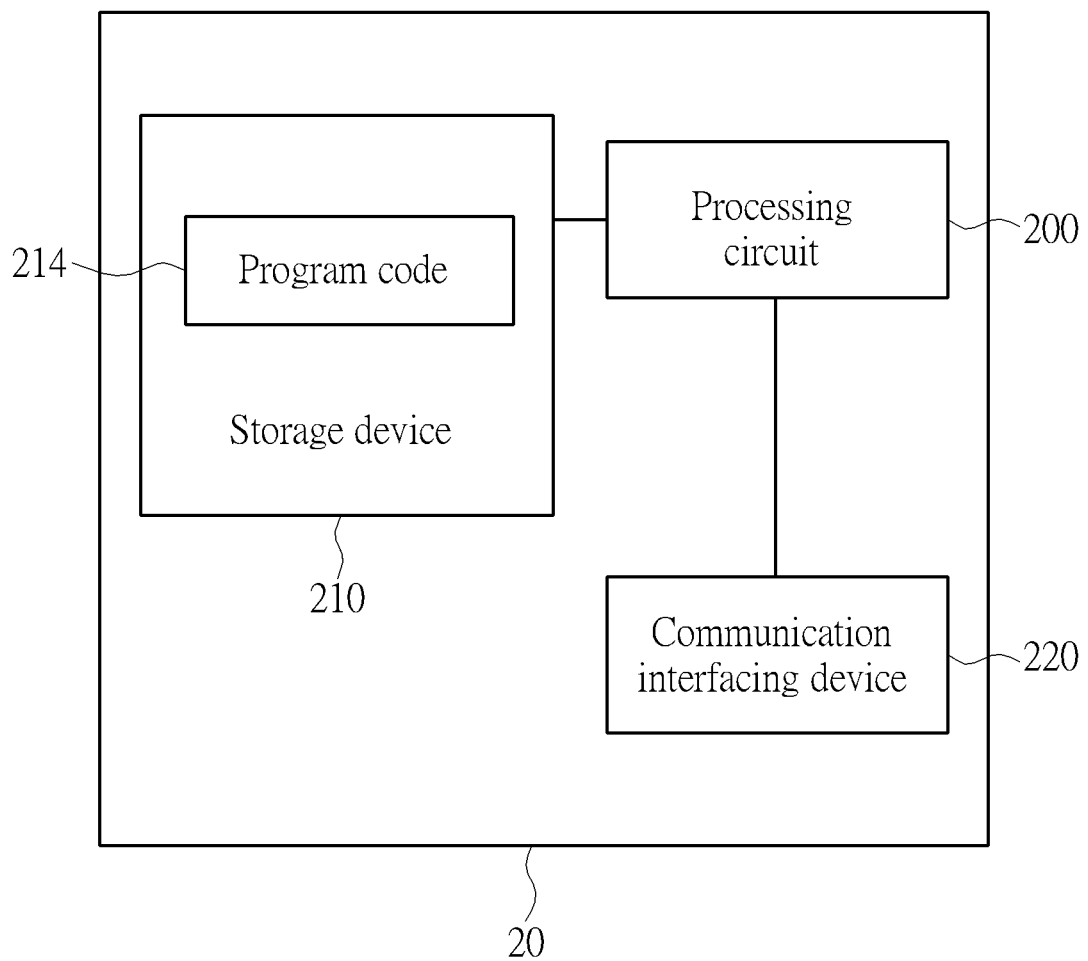
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes at least one transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
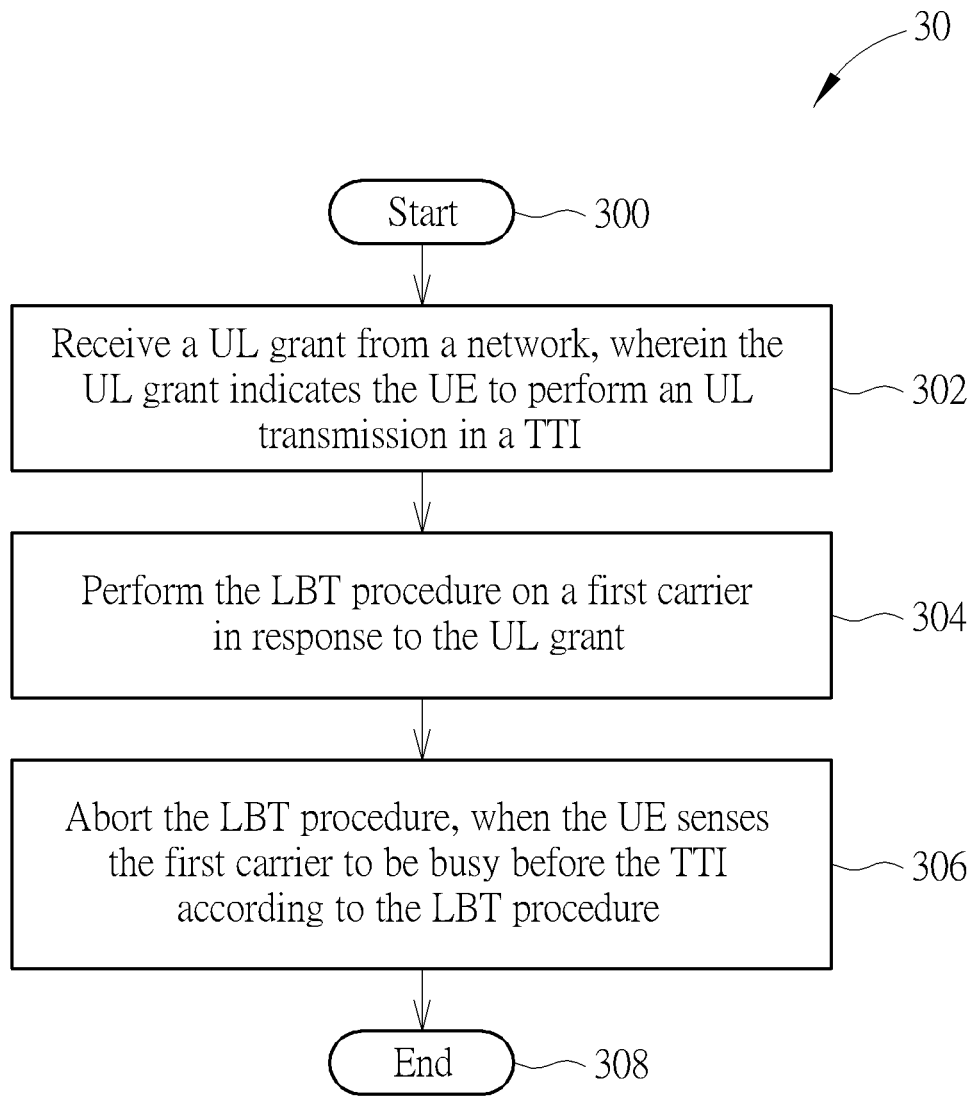
FIG. 3 is a flowchart of a process according to an example of the present invention.

FIG. 3 is a flowchart of a process 30 according to an example of the present invention. The process 30 can be utilized in a UE, for handling a LBT procedure in an unlicensed band. The process 30 includes the following steps:

Step 300: Start.

Step 302: Receive a UL grant from a network, wherein the UL grant indicates the UE to perform an UL transmission in a transmission time interval (TTI).

Step 304: Perform the LBT procedure on a first carrier in response to the UL grant.

Step 306: Abort the LBT procedure, when the UE senses the first carrier to be busy before the TTI according to the LBT procedure.

Step 308: End.

According to process 30, when the UE fails to perform an UL transmission in a TTI according to an UL grant due to carrier busy detected by the LBT procedure on a carrier, the UE aborts the LBT procedure. Thus, the UE does not waste power to sense (i.e., receive) the carrier.

Realization of the process 30 is not limited to the above description. The following examples may be applied to the process 30.

In one example, the UE performs the UL transmission on a first carrier according to the UL grant, after the UE senses the first carrier to be idle before the TTI according to the LBT procedure.

In one example, the UL grant is transmitted by a BS in the network to the UE on the first carrier or on a second carrier. The second carrier may be a licensed carrier or an unlicensed carrier. The UL grant may be transmitted by the BS on a physical DL control channel (PDCCH), an enhanced PDCCH (EPDCCH), a machine-type-communications (MTC) PDCCH (MPDCCH), a narrowband PDCCH (NPDCCH) or a shortened PDCCH (sPDCCH) scrambled with a cell radio network temporary identifier (C-RNTI). The UL grant may include a resource block assignment, a modulation and coding scheme (MCS), a new data indicator or a hybrid automatic repeat request (HARQ) process number.

The LBT procedure may be performed according to the following examples.

The UE may perform a transmission on a carrier in a TTI according to an UL grant received from a BS, after sensing the channel to be idle during slot durations of a defer duration $T_d$, and after the counter $N_p$ is 0 in Step (4) of the steps below. The counter $N_p$ is adjusted by sensing the channel for additional slot duration(s) according to the following steps:

(1) set $N_p=N_{init,p}$, where $N_{init,p}$ is a random number uniformly distributed between 0 and $CW_p$, and go to Step (4);

(2) if $N_p>0$ and the UE chooses to decrement the counter, set $N_p=N_p-1$;

(3) sense the channel for an additional slot duration, and if the additional slot duration is idle, go to Step (4); else, go to Step (5);

(4) if $N_p=0$, stop; else, go to Step (2).

(5) sense the channel until either a bust slot is detected within an additional defer duration $T_d$ or all slots of the additional defer duration $T_d$ are detected to be idle;

(6) if the channel is sensed to be idle during all the slot durations of the additional defer duration $T_d$, go to Step (2); else, go to Step (5).

The defer duration $T_d$ may include a duration of 16 us$\leq T_f \leq$16 us+$T_s$ immediately followed by $m_p$ consecutive slot durations where each slot duration is 9 us$\leq T_{sl}\leq$9 us+$T_s$. $T_f$ may include an idle slot duration $T_{sl}$ at a start of $T_f$. The slot duration $T_{sl}$ is considered to be idle, if the BS senses the channel during the slot duration and power detected by the BS for at least 4 μs within the slot duration is less than an energy detection threshold $X_{Thresh}$. Otherwise, the slot duration $T_{sl}$ is considered to be busy.

In one example of Step (1), the BS draws a random number, and transmits the random number to the UE in the UL grant. Alternatively, the UE draws the random number and adjusts the contention window as follows. $CW_{min,p}\leq CW_p\leq CW_{max,p}$ is the contention window. $CW_p$ adjustment may be performed according to the following examples. $CW_{min,p}$ and $CW_{max,p}$ are chosen during Step (1) of the above procedure. In one example, $m_p$, $CW_{min,p}$ and $CW_{max,p}$ are based on a channel access priority class p associated with the transmission, as shown in a table 40 in FIG. 4. The table 40 includes channel access priority classes with corresponding parameters according to an example of the present invention. The UE may not continuously perform transmission(s) on a channel for a period exceeding $T_{mcot,p}$ as stated in the Table 40. For the channel access priority class p=3 and p=4, if the absence of any other technology sharing the carrier can be guaranteed on a long term basis (e.g., by level of regulation), $T_{mcot,p}$=10 ms, otherwise, $T_{mcot,p}$=8 ms.

In one example, when the UE aborts the LBT procedure, the UE does not counter down the counter N. In addition, the UE may not sense the first carrier until receiving a next UL grant.

In one example, the UL grant indicates a plurality of transmissions (including the first transmission) in a plurality of TTIs (including the first TTI). The UE may perform the LBT procedure independently for each of the plurality of transmissions in a TTI in the plurality of TTIs.

In one example, if the UL grant indicates a plurality of transmissions in a plurality of TTIs, the UL transmission may be the last transmission of the plurality of transmissions and the UL transmission is in the last TTI of the plurality of TTIs. The UE may initiate the LBT procedure for the earliest UL transmission of the plurality of transmissions in the earliest TTI of the plurality of TTIs. The UE has not sensed the first carrier to be idle before the last TTI of the plurality of TTIs in the LBT procedure.

In one example, the TTI includes a subframe, a time slot, two orthogonal frequency-division multiplexing (OFDM) symbols or four OFDM symbols.

It should be noted that the "random" described above may be interpreted as "pseudo random". The contents related to each channel access priority class in Table 40 may be changed, or a new channel access priority class (e.g., for radio resource control (RRC) and/or non-access stratum (NAS) message) may be added to the Table 40.

Figure 5:
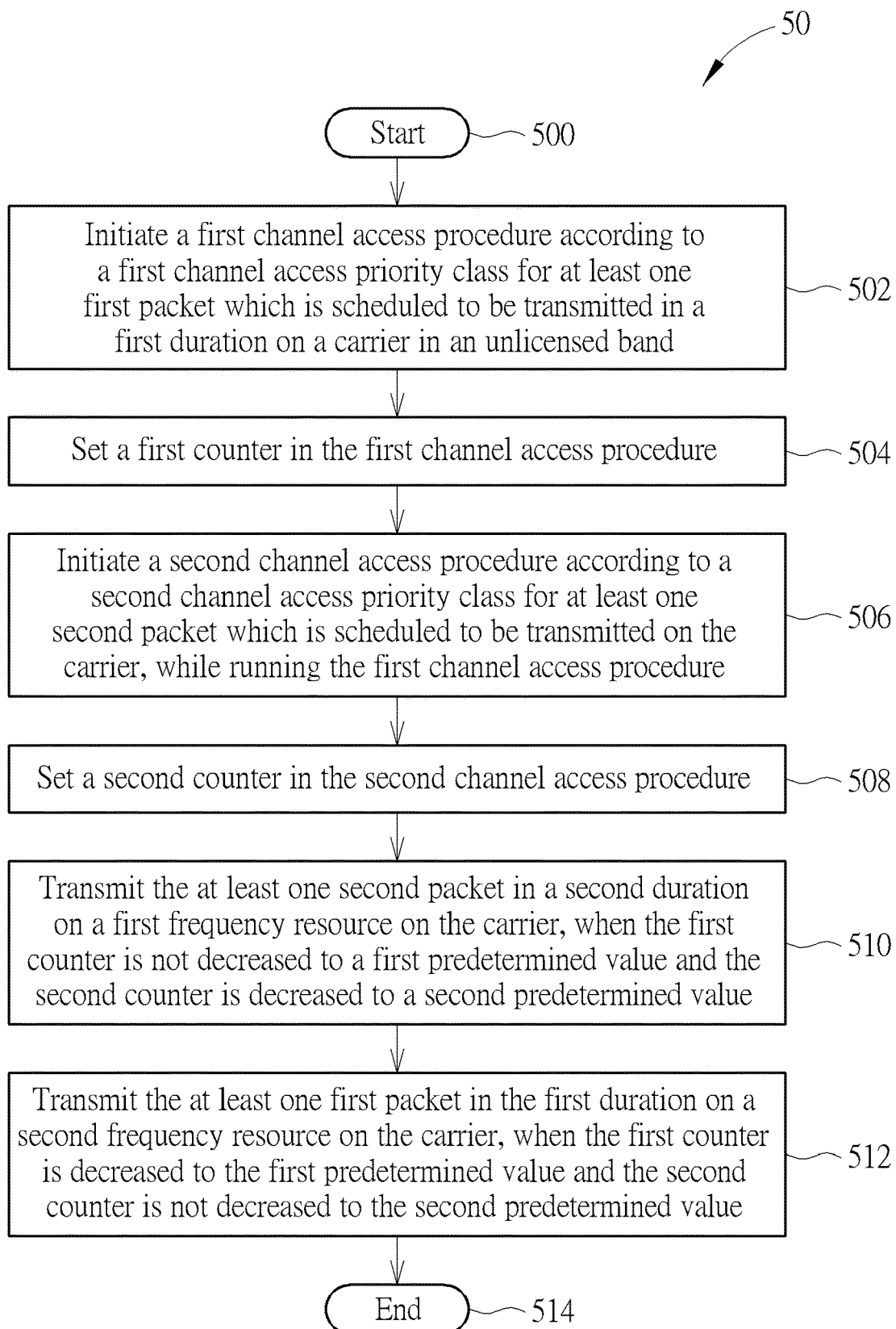
FIG. 5 is a flowchart of a process according to an example of the present invention.

FIG. 5 is a flowchart of a process 50 according to an example of the present invention. The process 50 can be utilized in a communication device (a UE or a BS), for handling a transmission in an unlicensed band. The process 50 includes the following steps:

Step 500: Start.

Step 502: Initiate a first channel access procedure according to a first channel access priority class for at least one first packet which is scheduled to be transmitted in a first duration on a carrier in an unlicensed band.

Step 504: Set a first counter in the first channel access procedure.

Step 506: Initiate a second channel access procedure according to a second channel access priority class for at least one second packet which is scheduled to be transmitted on the carrier, while running the first channel access procedure.

Step 508: Set a second counter in the second channel access procedure.

Step 510: Transmit the at least one second packet in a second duration on a first frequency resource on the carrier, when the first counter is not decreased to a first predetermined value and the second counter is decreased to a second predetermined value.

Step 512: Transmit the at least one first packet in the first duration on a second frequency resource on the carrier, when the first counter is decreased to the first predetermined value and the second counter is not decreased to the second predetermined value.

Step 514: End.

According to process 50, the communication device performs the two channel access procedures in parallel. The communication device determines transmitting the at least one first packet according to a result of the first channel access procedure and determines transmitting the at least one second packet according to a result of the second channel access procedure.

Realization of the process 50 is not limited to the above description. The following examples may be applied to the process 50.

In one example, the first and second channel access priority classes are different. The communication device may initiate the second channel access procedure, when the second channel access priority class is different from the first channel access priority class. In one example, the first channel access priority class and the second channel access priority class are the same. The communication device may not initiate the second channel access procedure, when the first and second channel access priority classes are the same.

In one example, the first duration and the second duration are the same or different. The first duration and the second duration may be one TTI or multiple TTIs. In one example, the first and second predetermined values are the same (e.g., 0), i.e., no difference between different channel access priority classes. In one example, the first and second predetermined values are different for different channel access priority classes.

In one example, when the communication device is a BS, the at least one first packet is received from a network (e.g., a mobility management entity (MME), a gateway or another BS). In one example, when the communication device is a BS, the at least one second packet is received from the network while the BS is running the first channel access procedure.

In one example of Step 510, the communication device transmits the at least one first packet in the second duration on a third frequency resource (i.e., the remaining frequency resource) on the carrier, if the communication device does not use all frequency resources on the carrier in the second duration to transmit all of the at least one second packet or if a transport block size assigned by the BS in an UL grant can accommodate more than all of the at least one second packet. If the communication device does not transmit all of the at least one first packet in the second duration on the third frequency resource (i.e., the remaining frequency resource) on the carrier, the communication device does not stop the first channel access procedure. If the communication device needs to transmit at least one third packet (e.g., an IP packet or a NAS message) associated to the first channel access priority while running the first channel access procedure, the communication device does not initiate a third channel access procedure for the at least one third packet. If the communication device transmits all of the at least one first packet, the communication device stops the first channel access procedure. Then, when the communication device receives or generates the at least one third packet, the communication device initiates the third channel access procedure according to the first channel access priority class. The communication device may transmit the at least one first packet and the at least one second packet, after first sensing the channel to be idle during the slot durations of a second defer duration $T_d$. The communication device may determine the second duration and the second defer duration according to the second channel access priority class. The communication device may receive the at least one third packet from the network or generate the at least one third packet by itself.

In one example of Step 512, the communication device transmits the at least one second packet in the first duration on a fourth frequency resource (i.e., the remaining frequency resource) on the carrier, if the communication device does not use all frequency resources on the carrier in the first duration to transmit all of the at least one first packet or if a transport block size assigned by the BS in an UL grant can accommodate more than all of the at least one first packet. If the communication device does not transmit all of the at least one second packet in the first duration on the fourth frequency resource (i.e., the remaining frequency resource) on the carrier, the communication device does not stop the second channel access procedure. If the communication device needs to transmit at least one fourth packet associated to the second channel access priority while running the second channel access procedure, the communication device does not initiate a fourth channel access procedure for the at least one fourth packet. If the communication device transmits all of the at least one second packet, the communication device stops the second channel access procedure. Then, when the communication device receives or generates the at least one fourth packet, the communication device initiates the fourth channel access procedure according to the second channel access priority class. The communication device may transmit the at least one first packet and the at least one second packet after first sensing the channel to be idle during the slot durations of a first defer duration $T_d$. The communication device may determine the first duration and the first defer duration according to the first channel access priority class. The communication device may receive the at least one fourth packet from the network or generate the fourth packet by itself.

In one example, when the communication device is the BS, the at least one first packet belongs to at least one first UE. The at least one second packet may belong to at least one second UE. The at least one first UE and the at least one second UE may have a same UE or no same UEs. The third packet may belong to one of the at least one first UE or the at least one second UE.

Figure 6:
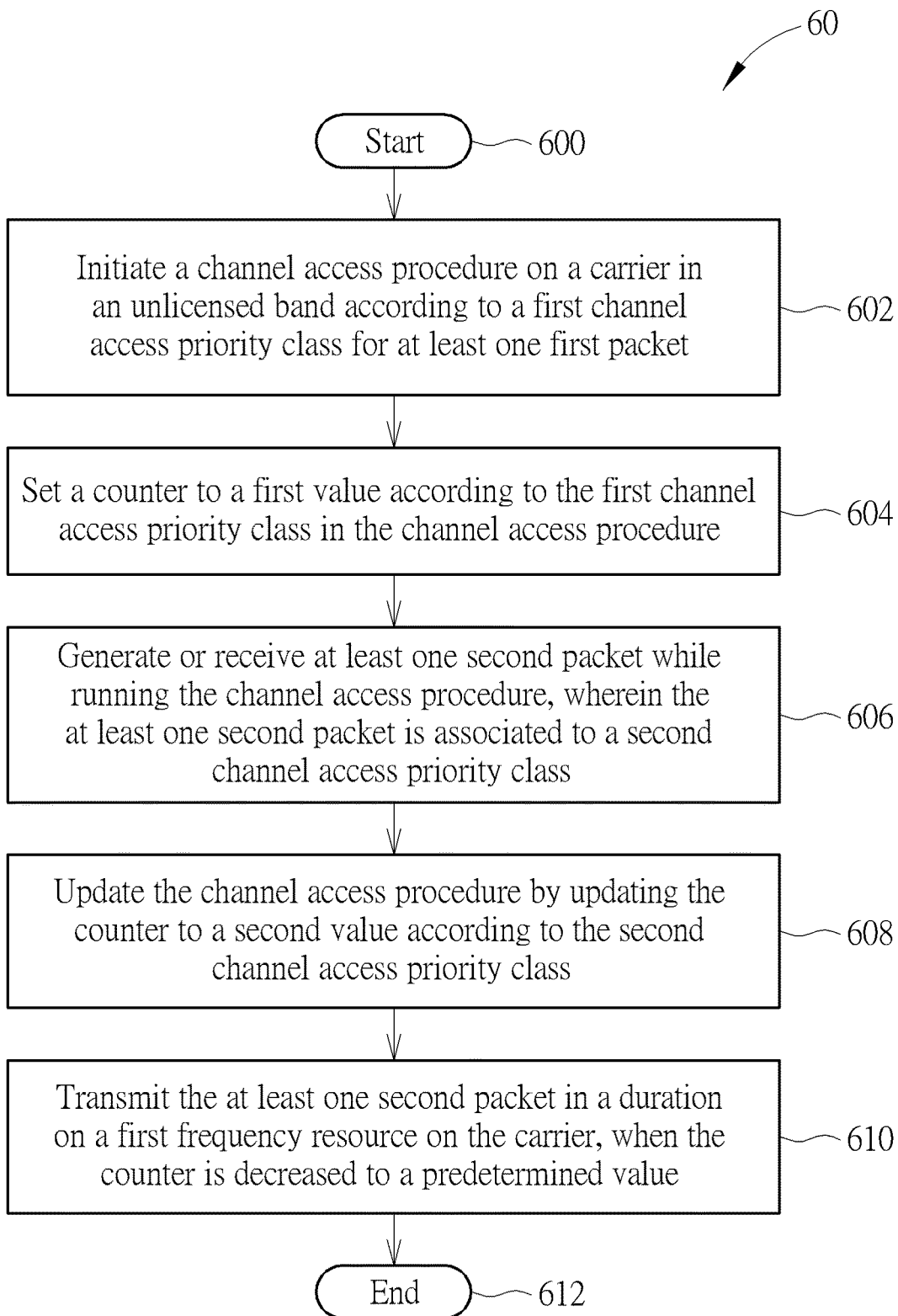
FIG. 6 is a flowchart of a process according to an example of the present invention.

FIG. 6 is a flowchart of a process 60 according to an example of the present invention. The process 60 can be utilized in a communication device (a UE or a BS), for handling a transmission in an unlicensed band. The process 60 includes the following steps:

Step 600: Start.

Step 602: Initiate a channel access procedure on a carrier in an unlicensed band according to a first channel access priority class for at least one first packet.

Step 604: Set a counter to a first value according to the first channel access priority class in the channel access procedure.

Step 606: Generate or receive at least one second packet while running the channel access procedure, wherein the at least one second packet is associated to a second channel access priority class.

Step 608: Update the channel access procedure by updating the counter to a second value according to the second channel access priority class.

Step 610: Transmit the at least one second packet in a duration on a first frequency resource on the carrier, when the counter is decreased to a predetermined value.

Step 612: End.

According to process 60, the communication device performs a channel access procedure for different packets which are associated to different channel access priority classes and are scheduled to be transmitted on the carrier.

Realization of the process 60 is not limited to the above description. The following examples may be applied to the process 60.

In one example, the communication device updates the channel access procedure according to the second channel access priority class when the second channel access priority class is different from the first channel access priority class. That is, the communication device updates the counter to a second value. In one example, the communication device updates the channel access procedure, when the second value is smaller than a current value of the counter. When the counter is decreased to the predetermined value (e.g., 0) in the channel access procedure, the communication device transmits the at least one second packet in the duration on the carrier.

In one example, the at least one first packet is associated to the first channel access priority class.

In one example, when the communication device is a BS, the at least one first packet is received from a network. In one example, when the communication device is a BS, the at least one second packet is received from the network. The at least one second packet is associated to the second channel access priority class.

In one example, the communication device generates the at least one first packet and the at least one second packet.

In one example of Step 610, the communication device transmits at least one of the at least one first packet in the duration on a second frequency resource (i.e., the remaining frequency resource) on the carrier, if the communication device does not use all frequency resources on the carrier in the duration to transmit all of the at least one second packet or if a transport block size assigned by the BS in an UL grant can accommodate more than all of the at least one second packet. The communication device may transmit the at least one first packet and the at least one second packet after first sensing the channel to be idle during the slot duration s of a defer duration $T_d$. The communication device may determine the duration and the defer duration according to the second channel access priority class. If the communication device generates or receives at least one third packet associated to the second channel access while running the channel access procedure after updating the channel access procedure, the communication device may not update the channel access procedure again. If the communication device generates or receives the at least one third packet associated to the first channel access priority class or a third channel access priority class while running the channel access procedure after updating the channel access procedure, the communication device may update the channel access procedure again according to the first channel access priority class or the third channel access priority class. The communication device may update the channel access procedure by updating the counter to a third value. In one example, the communication device may update the channel access procedure, when the third value is smaller than a current value of the counter. When the counter is decreased to the predetermined value (e.g., 0), the communication device transmits the at least one third packet after first sensing the channel to be idle during the slot durations of a defer duration $T_d$. The communication device may determine the duration and the defer duration according to the third channel access priority class. If the communication device does not use all frequency resources on the carrier in the duration to transmit the at least one third packet, the communication device may further transmit the at least one first packet or the at least one second packet in the duration on the remaining frequency resources on the carrier in the duration.

In one example, the communication device may receive the at least one third packet from the network when the communication device is the BS.

The following examples may be applied to the processes above.

In one example, the at least one first packet is associated to the first channel access priority class, and includes at least one of an IP packet, a RRC message, a NAS message, a PDCP PDU, a RLC PDU and a MAC PDU. In one example, the at least one second packet is associated to the second channel access priority class, and includes at least one of an IP packet, a RRC message, a NAS message, a PDCP PDU, a RLC PDU and a MAC PDU.

In one example, each of the at least one third and fourth packets includes at least one of an IP packet, a RRC message, a NAS message, a PDCP PDU, a RLC PDU and a MAC PDU.

Those skilled in the art should readily make combinations, modifications and/or alterations on the abovementioned description and examples. The abovementioned description, steps and/or processes including suggested steps can be realized by means that could be hardware, software, firmware, an electronic system, or combination thereof. An example of the means may be the communication device 20. Any of the above processes and examples above may be compiled into the program code 214.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling channel access in an unlicensed band, comprising:
a storage device, for storing instructions of:
initiating a first channel access procedure according to a first channel access priority class for at least one first packet;
setting a first counter in the first channel access procedure;
initiating a second channel access procedure according to a second channel access priority class for at least one second packet;
setting a second counter in the second channel access procedure;
transmitting the at least one second packet in a second duration on a first frequency resource on a carrier, when the first counter is not decreased to a first predetermined value and the second counter is decreased to a second predetermined value; and
transmitting the at least one first packet in thea first duration on a second frequency resource on the carrier, when the first counter is decreased to the first predetermined value and the second counter is not decreased to the second predetermined value; and
a processing circuit, coupled to the storage device, configured to execute the instructions stored in the storage device.

2. The communication device of claim 1, wherein the at least one first packet is associated to the first channel access priority class, and comprises at least one of an internet protocol (IP) packet, a radio resource control (RRC) message, a non-access stratum (NAS) message, a packet data convergence protocol (PDCP) protocol data unit (PDU), a radio link control (RLC) PDU and a medium access control (MAC) PDU; and the at least one second packet is associated to the second channel access priority class, and comprises at least one of an IP packet, a RRC message, a NAS message, a PDCP PDU, a RLC PDU and a MAC PDU.

3. The communication device of claim 1, wherein the at least one first packet is received from a network, and the at least one second packet is received from the network while the communication device is running the first channel access procedure.

4. The communication device of claim 1, wherein the storage device further stores the instruction of:
transmitting the at least one first packet in the second duration on a third frequency resource on the carrier.

5. The communication device of claim 1, wherein the storage device further stores the instruction of:
transmitting the at least one second packet in the first duration on a fourth frequency resource on the carrier.

6. A first communication device for handling channel access in an unlicensed band, comprising:
a storage device, for storing instructions of:
initiating a channel access procedure on a carrier in an unlicensed band according to a first channel access priority class for at least one first packet;
setting a counter to a first value according to the first channel access priority class in the channel access procedure;
generating or receiving at least one second packet while running the channel access procedure, wherein the at least one second packet is associated to a second channel access priority class;
updating the channel access procedure by updating the counter to a second value according to the second channel access priority class; and
transmitting the at least one first packet and the at least one second packet in a duration on a first frequency resource on the carrier to a second communication device, when the counter is decreased to a predetermined value, wherein the at least one second packet comprises at least one of an internet protocol (IP) packet, a radio resource control (RRC) message, a non-access stratum (NAS) message; and
a processing circuit, coupled to the storage device, configured to execute the instructions stored in the storage device.

7. The first communication device of claim 6, wherein the at least one first packet is associated to the first channel access priority class, and comprises at least one of an IP packet, a RRC message, a NAS message, a packet data convergence protocol (PDCP) protocol data unit (PDU), a radio link control (RLC) PDU and a medium access control (MAC) PDU.

8. A method of handling channel access in an unlicensed band for a communication device, the method comprising:
initiating a first channel access procedure according to a first channel access priority class for at least one first packet;
setting a first counter in the first channel access procedure;
initiating a second channel access procedure according to a second channel access priority class for at least one second packet;
setting a second counter in the second channel access procedure;
transmitting the at least one second packet in a second duration on a first frequency resource on a carrier, when the first counter is not decreased to a first predetermined value and the second counter is decreased to a second predetermined value; and
transmitting the at least one first packet in a first duration on a second frequency resource on the carrier, when the first counter is decreased to the first predetermined value and the second counter is not decreased to the second predetermined value.

9. The method of claim 8, wherein the first channel access priority class and the second channel access priority class are different.

10. The method of claim 8, wherein the at least one first packet is associated to the first channel access priority class, and comprises at least one of an internet protocol (IP) packet, a radio resource control (RRC) message, a non-access stratum (NAS) message, a packet data convergence protocol (PDCP) protocol data unit (PDU), a radio link control (RLC) PDU and a medium access control (MAC) PDU; and the at least one second packet is associated to the second channel access priority class, and comprises at least one of an IP packet, a RRC message, a NAS message, a PDCP PDU, a RLC PDU and a MAC PDU.

11. The method of claim 8, wherein the at least one first packet is received from a network, and the at least one second packet is received from the network while the communication device is running the first channel access procedure.

12. The method of claim 8, wherein the method further comprises:
transmitting the at least one first packet in the second duration on a third frequency resource on the carrier.

13. The method of claim 8, wherein the method further comprises:

transmitting the at least one second packet in the first duration on a fourth frequency resource on the carrier.

* * * * *